(12) United States Patent
Riviere et al.

(10) Patent No.: US 11,468,166 B2
(45) Date of Patent: Oct. 11, 2022

(54) EMBEDDED SYSTEM ON BOARD AN AIRCRAFT FOR DETECTION AND RESPONSE TO INCIDENTS WITH LOG RECORDING

(71) Applicant: THALES, Courbevoie (FR)

(72) Inventors: Caroline Dominique Riviere, Toulouse (FR); Gilles Descargues, Toulouse (FR); Véronique Nathalie Feyt, Toulouse (FR)

(73) Assignee: THALES, Courbevoie (FR)

( * ) Notice: Subject to any disclaimer, the term of this patent is extended or adjusted under 35 U.S.C. 154(b) by 96 days.

(21) Appl. No.: 16/831,059

(22) Filed: Mar. 26, 2020

(65) Prior Publication Data

US 2020/0311263 A1 Oct. 1, 2020

(30) Foreign Application Priority Data

Mar. 29, 2019 (FR) ...................................... 19 03356

(51) Int. Cl.
*G06F 21/55* (2013.01)
*B64F 5/60* (2017.01)

(52) U.S. Cl.
CPC .............. *G06F 21/554* (2013.01); *B64F 5/60* (2017.01); *G06F 2221/034* (2013.01)

(58) Field of Classification Search
CPC ............ G06F 21/554; G06F 2221/034; G06F 21/552; G06F 2201/81; G06F 2201/86; G06F 11/3476; G06F 11/3013; G06F 11/3082; G06F 17/40; B64F 5/60; G07C 5/0841; G07C 5/0808
See application file for complete search history.

(56) References Cited

U.S. PATENT DOCUMENTS 9,756,062 B2 * 9/2017 Dekel ................. H04L 63/1425
2008/0162592 A1 7/2008 Huang et al.
(Continued)

FOREIGN PATENT DOCUMENTS

| EP | 2987729 A1 * | 1/2015 | ............. B64D 45/00 |
| EP | 3716073 A1 * | 9/2020 | ............. G06F 11/30 |
| GB | 2475593 A * | 10/2010 | ............... G07C 5/00 |

OTHER PUBLICATIONS

French Search Report, from the French Patent Office in counterpart French Application No. 1903356, dated Dec. 10, 2019.

*Primary Examiner* — Christopher A Revak
(74) *Attorney, Agent, or Firm* — ArentFox Schiff LLP

(57) ABSTRACT

The invention relates to an embedded system on board an aircraft for detection and response to incidents with log recording, the aircraft comprising a calculator comprising applications using and generating data and being configured to detect events based on these data and predefined information specifying these events.

The system comprises, for the calculator, an agent and a collector. The agent is an application component dedicated to an identified application and is configured to apply an incident detection logic to the detected events in order to detect at least one incident and to send to the collector, through detection messages, each detected incident according to a configurable transmission logic. The collector is configured to receive the messages and to apply, to the messages, a configurable recording logic of the messages in one or several log(s).

15 Claims, 2 Drawing Sheets

(56) References Cited

U.S. PATENT DOCUMENTS

| | | | |
|---|---|---|---|
| 2016/0057160 A1* | 2/2016 | Buehler | B64D 45/0059 |
| | | | 726/23 |
| 2016/0150195 A1* | 5/2016 | Good | H04N 7/188 |
| | | | 348/143 |
| 2016/0292932 A1* | 10/2016 | Gremmert | H04B 7/18506 |
| 2017/0041331 A1 | 2/2017 | Graig et al. | |
| 2018/0285437 A1* | 10/2018 | Boggio | G06F 16/2465 |
| 2018/0288080 A1* | 10/2018 | Keller | H04L 63/1425 |
| 2021/0020056 A1* | 1/2021 | Chenchu | G08G 5/0013 |

* cited by examiner

EMBEDDED SYSTEM ON BOARD AN AIRCRAFT FOR DETECTION AND RESPONSE TO INCIDENTS WITH LOG RECORDING

CROSS-REFERENCE TO RELATED APPLICATIONS

This application claims priority to French Application No. 19 03356, filed on Mar. 29, 2019. The disclosure of the priority application is incorporated in its entirety herein by reference.

BACKGROUND OF THE INVENTION

Field of the Invention

The present invention relates to an embedded system on board an aircraft for detection and response to incidents with log recording/logging on board an aircraft.

An aircraft comprises at least one calculator comprising a plurality of applications using and generating data. The reception, the sending of data, the state change of an application, the reception-transmission of an analog or discrete signal constitutes an event from the point of view of the recipient.

More specifically, an event is defined as an incoming flow, that is to say, a datum, a signal, an interruption toward an application that can divert it from its processing in progress.

It is desirable to detect, among these events, those that could affect the safety of the flight of the aircraft, and which are called security incidents.

An incident is defined as one or several events with a flow, format, content, timing or frequency not compliant with the specification or the expectation. An incident can have several origins: malfunction of hardware or software component, abnormal operating conditions, incorrect configuration, malice, etc.

Among incidents, security incidents are in particular incidents that may or may not be of malicious origin and disrupting the information systems of the aircraft and for which a response is desired for operating safety and operability maintenance reasons of the aircraft.

For example, the events may be related to security incidents such as computer attacks (symptoms, traces or results sought by the attacker) introducing malfunctions of the aircraft.

The ability to detect these security incidents and respond thereto as closely and therefore as quickly as possible makes it possible to ensure operating safety by therefore taking account of the security of the embedded computer systems; this is the concept commonly referred to in the aeronautics field as "security for safety".

It is desirable to detect the security incidents in real time, among the events, so as to inform the crew of the aircraft thereof if applicable.

Description of Related Art

In the field of information technologies, software exists that is configured to monitor information security and manage events known under the acronym SIEM, which stands for "Security Information and Event Management".

These software applications are effective from the analysis of all of the logs coming from the applications making up the information systems to be monitored. They are fed by a large quantity of information, which may or may not be normalized, and offer aggregation, collection, analysis normalization and correlation functionalities of these information items in order to identify an intrusion, an illegal use of the system or any other malicious act. These devices can be used to make recordings said to be of probative value for the information systems requesting it, in particular with electronic billing.

Such software cannot currently be embedded on board aircraft for the monitoring of computing means allocated to the aircraft control domain (ACD), not only since they require substantial storage and computing power resources, but especially since they do not yet have enough analyzable material (the logs). Indeed, log production by the embedded calculators of the aircraft control domain is nonexistent depending on the aircraft.

A log is a persistent recording timestamped by a system or an events application and their consequences that includes contextual data and a severity level.

This production requires computing means such as a central processing unit (CPU) or nonvolatile memories available in a limited manner for cost and carrying reasons. This is therefore a hindrance. It is also necessary to add the need to ensure a high level of qualification of the products resulting from operating safety requirements, as defined by a certain number of standards, such as standard DO 178C.

Furthermore, these software applications require frequent updates or a modification of their configuration requiring significant maintenance, which is not desirable.

As a result, currently, the events detected during the flight of the aircraft and which could jeopardize the flight safety are processed, but not logged, much less reported, whether to the SOC (Security Operation Center) or to the crew.

The SOC is a security operation center of an airline company on the ground.

BRIEF SUMMARY OF THE INVENTION

The present invention aims to address the raised issues by proposing an embedded system for detections of and responses to incidents on board an aircraft with incident recording that is in particular not very greedy in terms of computing power, storage space. Furthermore, the invention makes it possible to implement the embedded system on new aircraft as well as already-commissioned aircraft.

To that end, the invention relates to an embedded system on board an aircraft for detection and response to incidents with log recording, the aircraft comprising at least one calculator comprising a plurality of applications using and generating data, each application being configured to detect events based on data used and generated by this application and predefined information specifying these events, the system comprising, for the or each calculator, an agent and a collector, the agent being an application component dedicated to an identified application of the calculator and being configured to apply an incident detection logic to the events detected by the identified application in order to detect, among these events, at least one incident and to send to the collector, through detection messages, each detected incident according to a configurable transmission logic, and the collector being configured to receive the detection messages coming from the agent for each detected incident and to apply, to the detection messages, a configurable recording logic of the detection messages in one or several log(s).

According to other advantageous aspects of the invention, the system comprises one or more of the following features, considered alone or according to all technically possible combinations:

- the agent and the collector are configured such that the detection of the incidents as a function of the detection logic and the recording of the detection messages in one or several log(s) in function of the recording logic are implemented independently within the embedded system.
- the detection logic defines at least one specified threshold of the detection frequency of the events and/or at least one specified threshold of the number of occurrences of the events in order to detect at least one incident.
- the system comprises a plurality of agents, each agent being similar to said agent and, preferably, corresponds to one of the agents from the following list: an agent integrated into an operational application of the calculator, an agent integrated into a support application of the calculator, an agent integrated into an application responsible for downloads and configuration of the calculator, an agent monitoring a specific protocol for data exchanges between two applications of the same calculator or between the calculator and another remote calculator.
- the agent is an agent integrated into an application responsible for downloads and the configuration of the calculator and belongs to the collector.
- the transmission logic defines parameters and the agent is configured to aggregate the detection messages of this incident in function of the parameters of the transmission logic.
- for each detected incident, the transmission logic defines at least one threshold of the number of detection occurrences of this incident and/or at least one detection frequency threshold of this incident for the triggering of the transmission of the detection messages of this incident to the collector.
- the recording logic defines parameters and, for each detected incident, the collector is configured to aggregate the detection messages of this incident in function of the parameters of the recording logic.
- for each detected incident, the recording logic defines at least one threshold of the number of occurrences of detection messages of this incident and/or at least one reception frequency threshold of the detection messages of this incident.
- the collector has context data relative to the aircraft and/or the flight of the aircraft and is configured to enrich the logs with the context data.
- the collector is configured to record the log(s) in a predefined normalized format.
- at least one detected incident corresponds to a computer attack of the aircraft.
- the system further comprises an alert unit intended to emit one or several alerts in real time based on the log(s), the alerts being intended for a crew of the aircraft.
- the detection system comprises transmission means configured to transfer the log(s) to a security center on the ground.

BRIEF DESCRIPTION OF THE DRAWINGS

The features and advantages of the invention will be better understood upon reading the following description, provided solely as a non-limiting example, and done in reference to the appended drawings, in which.

DETAILED DESCRIPTION OF THE INVENTION

Figure 1:
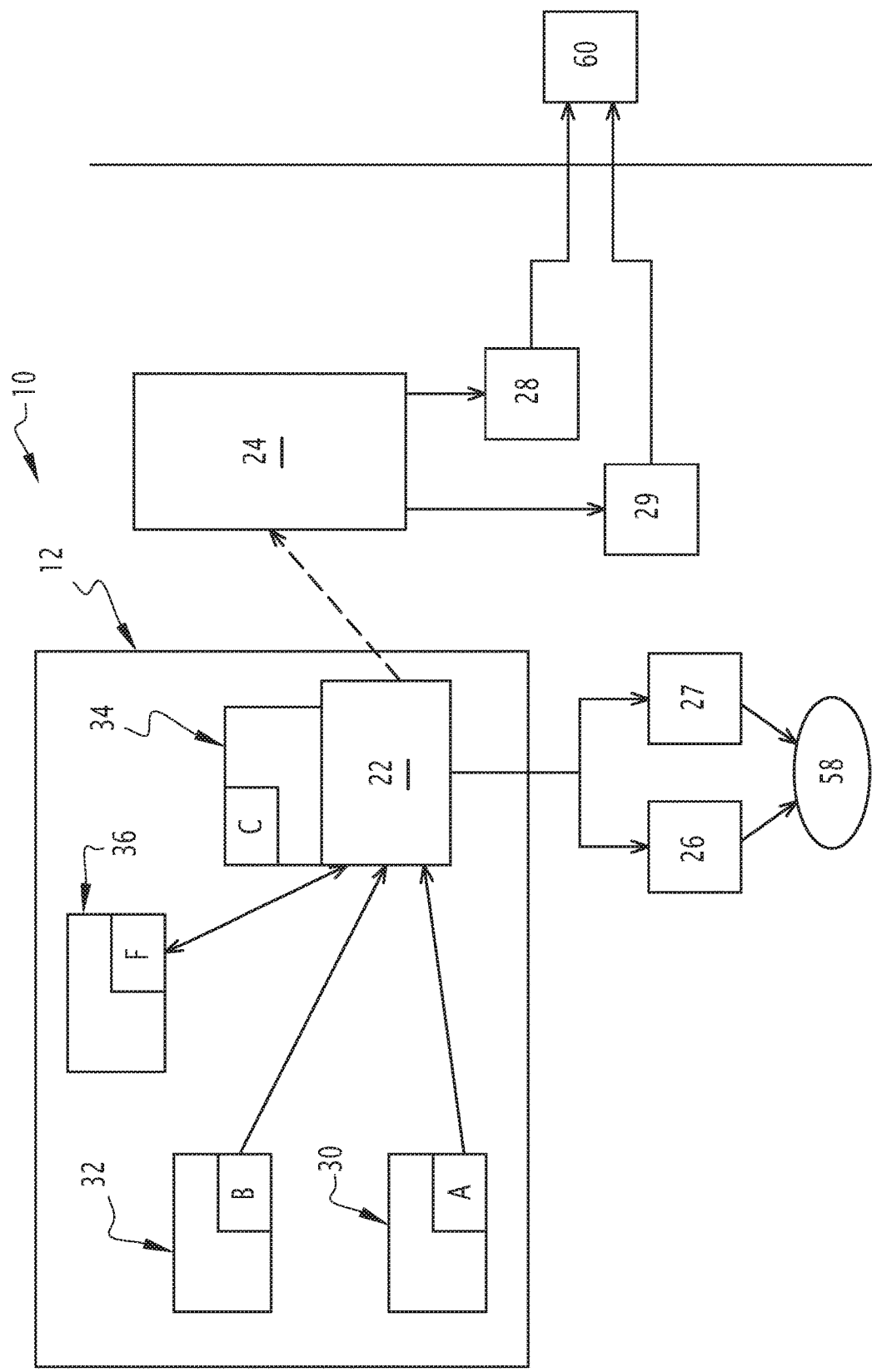
FIG. 1 is a block diagram of the system according to the invention.

An embedded system 10 on board an aircraft for detection and response to incidents with log recording is illustrated in FIG. 1.

The aircraft comprises at least one calculator comprising a plurality of applications using and generating data. For example, the aircraft comprises a plurality of calculators.

Each application is configured to detect events based on data used and generated by this application and predefined information specifying these events.

An event is defined generally speaking as an incoming flow such as a datum, a signal, an interruption toward an operation, a system and/or an application able to divert this operation, this system or this application from its processing in progress.

In the present application, the incoming flow corresponds to the data used and generated by each application 30, 32, 34, 36.

A single calculator 12 is shown in FIG. 1.

The system 10 comprises, for the or each calculator 12, a plurality of agents A, B, C, F and at least one collector 22. Each agent A, B, C, F is connected to the collector 22. The system 10 further comprises a centralization unit 24, an alert unit 26, an information display unit 27, a data-link connection 28 and a secure server 29.

Each agent A, B, C, F is an application component dedicated to an identified application 30, 32, 34, 36 of the calculator 12.

Each agent A, B, C, F is configured to analyze the events detected by the different applications 30, 32, 34, 36.

Each agent A, B, C, F is configured to apply an incident detection logic to the events detected by the application 30, 32, 34, 36 that is dedicated to it in order to detect at least one incident.

Each agent A, B, C, F is further configured to send to the collector 22, by detection messages, each detected incident using a configurable transmission logic.

The collector 22 is configured to receive the detection messages coming from the agents A, B, C, F for each detected incident and to apply, to the detection messages, a configurable recording logic of the detection messages in one or several log(s).

A detected incident corresponds to one or several events with a flow, format, content, timing or frequency not compliant with the specification or the expectation.

The incidents can be related to an attack against the aircraft or be related to a failure of equipment of the aircraft or to human error.

It is desirable to determine, among the set of detected incidents 42, those that are "security incidents".

Security incidents are incidents that may or may not be of malicious origin and disrupting the information systems of the aircraft and for which a response is desired for operating safety and operability maintenance reasons of the aircraft.

Thus, at least one detected incident 42 can correspond to an attack, for example a computer attack of the aircraft.

Computer attacks are for example security incidents of malicious origin.

As previously indicated, a log is a persistent recording timestamped by a system or an events application and their consequences may include contextual data and a severity level.

In the present exemplary embodiment, the system comprises four agents A, B, C, F.

A first agent is also known under the name "cyber agent A". The cyber agent A is an application component integrated into an operational application 30 of the calculator 12 coupled to the operating safety mechanisms of the calculator 12.

The cyber agent A is configured to monitor sensitive data. Sensitive data refers to a datum relative to the security of the aircraft.

A second agent is also known under the name "cyber agent B". Cyber agent B is an application agent integrated into a support application 32 of the calculator 12 as close as possible to the usage domain verification mechanisms.

Cyber agent B is configured to monitor the usage domains of the operating system by the applications (processing of API (Application Programming Interface) errors, access rights, etc.), the usage domains of the support applications (communication protocols, that is to say, for example, the frequency of messages and the compliance of these protocols) and/or the usage domains of the calculator 12 ("watchdog", "reset").

A third agent is known under the name "cyber agent C". Cyber agent C is an application component integrated into an application 34 responsible for downloads and the configuration of the calculator 12.

Cyber agent C is configured to monitor verification failures (authentication, integrity, completeness) and usage failures (compatibility, compliance, relevance).

According to one specific exemplary embodiment, cyber agent C is part of the collector 22.

A fourth agent is also known under the name "cyber agent F". Cyber agent F is integrated into an application 36 configured to monitor a specific data exchange protocol between two applications of the same calculator 12 or between the calculator 12 and another remote calculator.

Figure 2:
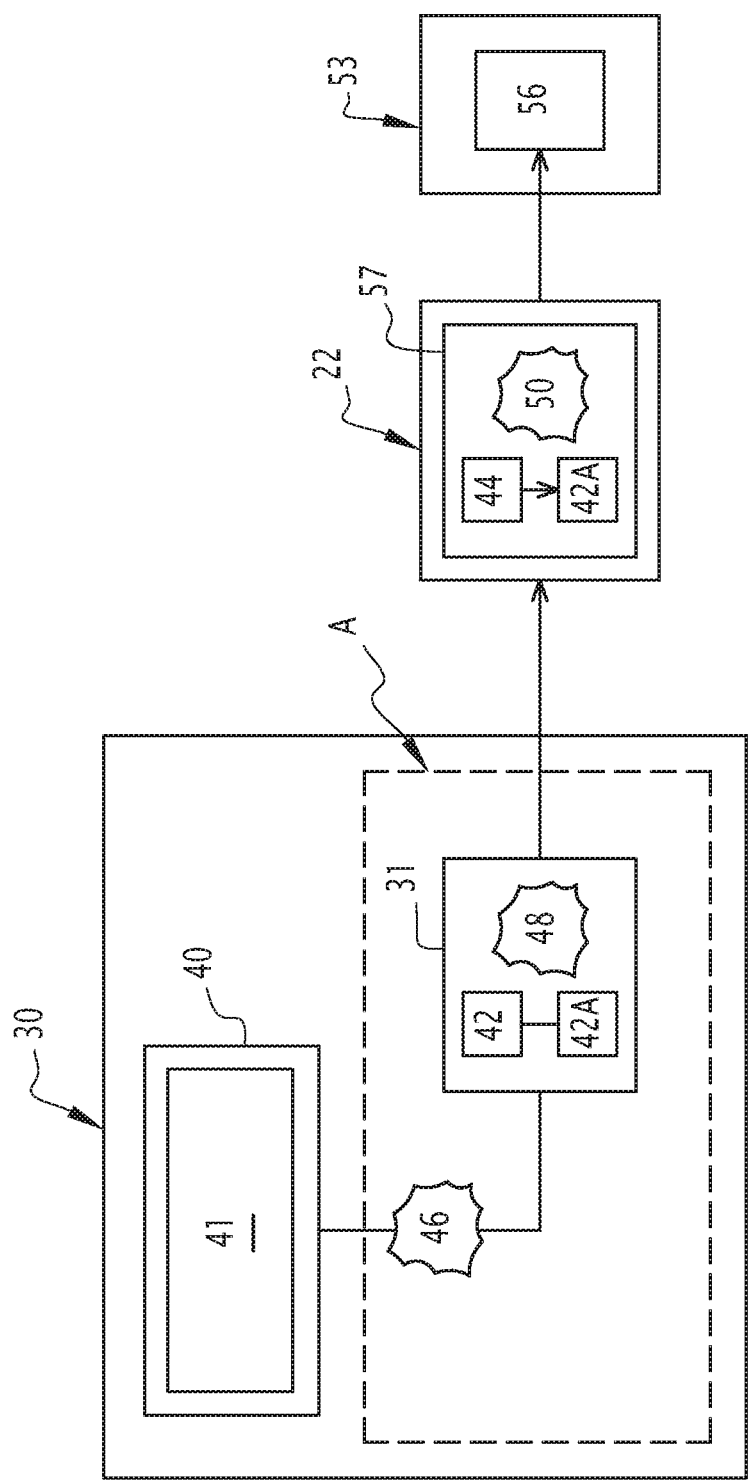
FIG. 2 is a detail view of part of FIG. 1.

In reference to FIG. 2, cyber agent A, the collector 22 and the logs 56 are described in detail. The other cyber agents B, C, F are structurally similar to cyber agent A and will therefore not be described in detail hereinafter.

As previously indicated, cyber agent A is dedicated to the application 30.

Cyber agent A is associated with a volatile memory 31 of the calculator 12.

The data used and generated by the application 30 are identified by numerical reference 40.

The used and generated data 40 comprise events 41.

The application 30 is configured to detect the events 41 based on used and generated data 40 and predefined information specifying these events.

The cyber agent A is configured to apply an incident detection logic 46 to the events detected 41 by the application 30 in order to detect at least one incident 42.

The detection logic 46 defines at least one specified threshold of the detection frequency of the events 41 and/or at least one specified threshold of the number of occurrences of the detected events 41 in order to detect at least one incident 42.

As an example, the detection limit 46 defines a specified flow, format, content, timing and/or frequency relative to the detected events 41.

The detection logic 46 is configured to compare the flow, format, content, timing and/or frequency relative to the detected events 41 to the specified flow, format, content, timing and/or frequency.

The events 41 that do not conform to the specification, that is to say, to the specified flow, format, content, timing and/or frequency form incidents 42.

The volatile memory 31 is configured to store the incidents 42 detected by cyber agent A.

The incidents 42 are identified by a unique identifier that is representative, for example, of the application 30, the agent dedicated to this application, which in the present case is cyber agent A, and an incident type.

Cyber agent A is further configured to send to the collector 22, by detection messages 42A each detected incident 42 using the transmission logic 48.

For example, each detection message 42A of a detected incident 42 comprises a datum representative of an identification number of this incident 42, a datum representative of the occurrence of this incident 42 or the detection frequency of this incident 42, and a datum representative of the generation date UTC of the detection message 42A and/or of the detection date UTC of the incident 42.

More specifically, for each detected incident 42, the cyber agent A is configured to aggregate, in the volatile memory 31, the detection messages 42A of this incident 42 in function of the parameters of the transmission logic 48.

This aggregating mechanism makes it possible to minimize the disruption of the operational working of the application 30 and avoids introducing new vulnerabilities, in particular availability attacks.

For example, for each detected incident 42, the transmission logic 48 defines at least one threshold of the number of detection occurrences of this incident 42 and/or at least one detection frequency threshold of this incident 42 for the triggering of the transmission of the detection messages 42A of this incident 42 to the collector 22.

In other words, for each detected incident 42, at least one threshold is defined in terms of the number of detection occurrences of this incident 42 and/or at least one detection frequency threshold of this incident 42 that makes it possible to trigger the transmission of the detection messages 42A of this incident 42 from cyber agent A to the collector 22.

Thus, the exceeding of the threshold(s) defined by the transmission logic can trigger the transmission of the detection messages 42A to the collector 22.

As an example, in the case of counting of the number of detection occurrences of an incident 42, the parameters of the transmission logic 48 define a first threshold of the number of occurrences of this incident 42 and a second threshold of the number of occurrences of this incident 42.

When the first threshold is reached, cyber agent A is configured to perform a first transmission of the detection messages 42A of said incident 42 to the collector 22. When the second threshold is reached, cyber agent A is configured to perform a second transmission of the detection messages 42A of said incident 42.

According to one specific exemplary embodiment, the parameters of the transmission logic 48 also define, for each detected incident 42, a first transmission mode of the detection messages 42A or a second transmission mode of the detection messages 42A to the collector 22.

The applied transmission mode depends on the detected incident 42.

The first transmission mode corresponds to the transmission of the detection messages in the execution flow during the application 31. The first transmission mode is applied for detected incidents 42 that are called "major".

The second transmission mode is an available time transmission mode in a dedicated time frame (placement in cache, processing with slight delay).

The collector 22 is configured to receive the detection messages 42A for each detected incident 42.

The collector 22 is an application component. In particular, the collector 22 is configured to analyze the detection messages 42A, place them in cache, decide if and when to record them and with which data.

Furthermore, the collector 22 has context data 44 relative to the aircraft and/or the flight of the aircraft.

Thus, the collector 22 is configured to associate the context data 44 with the received detection messages 42A.

The context data 44 are for example data representative of the aircraft and/or the flight of the aircraft. More specifically, the context data are for example representative of the current flight phase of the aircraft, the identity of the aircraft and/or data representative of a beginning or end of sensitive operational processing.

The collector 22 is further configured to apply, to the detection messages 42A, a configurable recording logic 50 in order to record the detection messages 42A in one or several log(s) 56.

In particular, for each detected incident 42, the recording logic 50 defines parameters that define at least one threshold of the number of reception occurrences of the detection messages 42A of this incident 42 and/or at least one reception frequency threshold of the detection messages 42A of this incident 42.

The thresholds defined of the transmission logic 48 and of the recording logic 50 make it possible to exclude an accidental or temporary phenomenon and of an origin other than a security incident against the aircraft.

For each detected incident 42, the collector 22 is configured to aggregate the detection messages 42A of this incident 42 in function of the parameters of the recording logic 50.

For example, the collector 22 is associated with a volatile memory 57 of the calculator 12.

For example, the collector 22 is configured to aggregate the detection messages 42 and the volatile memory 57 in function of the parameters of the recording logic 50 and to associate the context data 44 with these aggregated detection messages 42.

The collector 22 is then configured to record, for each detected incident 42, the detection messages 42A of this incident 42 and to enrich these detection messages 42A with the context data 44 in the form of one or several log(s) 56 in a non-volatile memory 53 of the calculator 12 associated with the collector 22.

Only the collector 22 has access rights to the non-volatile memory 53.

According to one specific exemplary embodiment, the collector 22 is also configured to correlate different detected incidents 42 and known context data 44.

For example, the collector 22 stores a correlation table that associates different detected incidents 42 with one another, for example as a function of detected incident types, or that associates different detected incidents 42 and given context data 44 with one another.

As a function of the correlation table, the collector 22 is then configured to correlate several detection messages 42A of several detected incidents 42 enriched with context data 44 and to record them in one 56 in the non-volatile memory 53.

The collector 22 is configured to record the logs 56 in a predefined normalized format.

The logs 56 are representative of one or several security incident(s) for the aircraft.

Thus, the system 10 makes it possible to determine, among the incidents, the security incidents.

For example, the logs 56 correspond to one or several computer attack(s) of the aircraft.

In reference to FIG. 1, the centralization unit 24 is coupled to the collector 22. The collector 22 is further configured to transfer the recorded logs 56 to the centralization unit 24.

The centralization unit 24 is configured to receive the recorded logs 56 and to transfer them to a security operations center (SOC) 60 of the airline company located on the ground via the data-link connection 28 and/or the security server 29.

The alert unit 26 is configured to emit one or several alerts based on the log(s) 56, the alerts being intended for a crew 58 of the aircraft, for example, the pilot or the navigating personnel.

The alert unit 26 is connected to the collector 22.

The information display unit 27 is also connected to the collector 22 and is configured to receive the logs 56 and to deliver a display representative thereof to the crew 58 of the aircraft.

In a variant, the system 10 has no centralization unit 24. In such a case, the collector 22 is configured to transmit the logs 56 to the security center 60 on the ground.

Thus, the collector 22 is for example able to store a predefined and configurable transmission logic of the logs 56 to the security center 60 on the ground.

The operation of the system 10 according to the invention is disclosed hereinafter.

The operation of the system 10 is disclosed hereinafter in relation with the operational application 30 and cyber agent A.

The embedded recording system 10 has an operation similar to the other agents B, C and F, the only difference being the nature of the data used and generated by the agents B, C, F.

In reference to FIG. 2, the operational application 30 detects events 41 as a function of data used and generated 40 by this application 30 and predefined information specifying these events 41.

Cyber agent A receives the events 41 and applies the incident detection logic 46 to the events 41 in order to detect, among these events 41, at least one incident 42.

Then, for each detected incident 42, cyber agent A generates detection messages 42A for this incident 42.

Furthermore, for each detected incident 42, cyber agent A aggregates the generated detection messages 42A as a function of the parameters of the transmission logic 48 in the volatile memory 31.

This optimized caching mechanism allows local aggregating of the detection messages 42A with the possibility of verifying the number of detection occurrences of the incident 42 or the detection frequency of the incident 42 compared with the thresholds defined by the parameters of the transmission logic 48.

This optimized caching mechanism then makes it possible to verify the number of occurrences of an incident 42 and/or the detection frequency of the incident 42 and to compare this number and/or this frequency to the thresholds defined by the parameters of the transmission logic 48 before transmitting the detection messages 42A to the collector 22.

According to one specific exemplary embodiment, for each detected incident 42, the transmission logic 48 defines a first threshold and a second threshold of the number of detection occurrences of this incident 42, as was previously disclosed. Then, for each detected incident 42, when the first threshold of the number of detection occurrences of this incident 42 is reached, cyber agent A transmits the aggregated detection messages 42A via a first transmission to the collector 22. Furthermore, when the second threshold of the number of detection occurrences of this incident 42 is reached, cyber agent A transmits the aggregated detection messages 42A to the collector 22 via a second transmission.

When the collector 22 receives the detection messages 42A, the collector 22 enriches the received detection messages 42A with the context data 44.

Then, the collector 22 applies the recording logic 50 to the detection messages 42A received from cyber agent A.

For each detected incident 42, cyber agent A aggregates the detection messages 42A as a function of the parameters of the recording logic 50 enriched with the context data 44.

More specifically and according to one specific embodiment, for each detected incident 42, when the threshold of the number of detection message occurrences 42A of this incident 42 and/or when the reception frequency threshold of the detection messages 42A of this incident 42 defined for the recording logic 50 is reached, the collector 22 records the aggregated messages 42A enriched with context data 44 in the form of one or several log(s) 56 in the non-volatile memory 53.

According to one specific exemplary embodiment, the collector 22 makes a correlation between the detection messages 42A of several different incidents 42 and the known state data 44 that are also recorded in one or several log(s) 56.

For example, this correlation is made via the correlation table stored in the nonvolatile memory of the collector 22.

In reference to FIG. 1, the logs 56 are transmitted to the centralization unit 24 via the collector 22 that is connected to the centralization unit 24.

Based on the logs 56, the collector 22 activates the alert unit 26 intended for the crew 58 of the aircraft and/or the display unit 27.

Furthermore, the centralization unit 24 transmits the logs 56 to the security center 60 on the ground via the data-link connection 28 and/or via the secure server 29.

The embedded system 10 according to the invention allows the identification and the recording of security incidents on board the aircraft in real time and is inexpensive in terms of storage capacity and computing power.

Indeed, owing to the system according to the invention, it is possible to determine the security incidents from among the incidents.

In particular, the fact that the cyber agents A, B, C, F and the collector 22 are configured such that the detection of the incidents 42 and the recording of the logs 56 are independent makes it possible not to cause overloading of the applications and not to divert the application from its current task.

Furthermore, the two levels of aggregation, one at the agents A, B, C, F and the other at the collector 22, makes it possible to obtain an embedded system 10 that is resilient to the occurrence of massive incidents, whether they are malicious, that is to say, symptomatic of an attack, or associated with failures.

The implemented transmission logic 48 and recording logic make it possible to exclude an accidental or temporary phenomenon and an origin other than a security incident against the aircraft. Thus, the invention makes it possible to determine the security incidents from among the events and to generate logs relative to these security incidents.

Furthermore, the fact that the crew can be alerted in real time of the recording of logs 56 and therefore the occurrence of security incidents allows the crew to take appropriate measures as quickly as possible relative to these security incidents.

Furthermore, the granting of access in non-volatile memory 53 only to the collector 22 makes it possible to limit the introduction of new vulnerabilities.

Moreover, the system 10 according to the invention can be implemented on new aircraft. It allows the processing of so-called "legacy" architectures, that is to say, it can be introduced on aircraft in use progressively.

The system 10 according to the invention is also adaptable. It can be introduced into the aircraft incrementally. In other words, applications with no agent can cohabitate with applications comprising agents A, B, C, F on the same calculator 12.

Still another advantage of the system according to the invention relates to the integration of the solution into the existing operational procedures derived from the application of the recommendations on maintenance under ARINC 624-1.

The system according to the invention has no impact on the operational methods (follow-up of recommendations ARINC 811).

Furthermore, owing to the system according to the invention, no cyber skill is required on board the aircraft, or MRO (Maintenance, Repair and Overhaul) skill.

Thus, for each detected incident 42, the transmission logic 48 is configured to trigger or not trigger the transmission of detection messages 42A for this incident 42 in function of defined parameters of the transmission logic 48.

Furthermore, for each detected incident 42, the recording logic 50 is configured to trigger or not the recording of detection messages 42A for this incident 42 in function of the parameters defined for this recording logic 50.

The invention claimed is:

1. An embedded system on board an aircraft for detection and response to incidents with log recording, the aircraft comprising at least one calculator comprising a plurality of applications using and generating data, each application being configured to detect events based on data used and generated by this application and predefined information specifying these events, the system comprising, for the or each calculator, an agent and a collector, the agent and the collector being embedded on board of the aircraft, the agent being an application component dedicated to an identified application of the calculator, the agent being configured to apply an incident detection logic to the events detected by the identified application in order to detect, among these events, at least one incident and the agent being configured to generate detection messages of the detected incident, the agent being configured to aggregate the detection messages of the detected incident in function of defined parameters of a configurable aggregation and transmission logic and the agent being configured to send the aggregated detection messages of the detected incident in function of the defined parameters of the configurable aggregation and transmission logic to the collector, the collector being configured to receive the detection messages of the detected incident aggregated by the agent and coming from the agent, the collector being configured to aggregate the detection messages of the detected incident received from the agent and to apply, to the detection messages, a configurable recording logic of the detection messages in one or several log(s), the configurable recording logic being configured to trigger or not trigger the recording of the detection messages in function of defined parameters of the configurable recording logic,
each log of the one or several log(s) being representative of an avionic security incident.

2. The system according to claim 1, wherein the agent and the collector are configured such that the detection of the incidents in function of the detection logic and the recording of the detection messages in one or several log(s) in function of the recording logic are implemented independently from each other within the embedded system.

3. The system according to claim 1, wherein the detection logic defines at least one specified threshold of the detection frequency of the events or at least one specified threshold of the number of occurrences of the events in order to detect at least one incident.

4. The system according to claim 1, comprising a plurality of agents, each agent being similar to said agent.

5. The system according to claim 4, wherein each agent corresponds to one of the agents from the following list:
- an agent integrated into an operational application of the calculator,
- an agent integrated into a support application of the calculator,
- an agent integrated into an application responsible for downloads and configuration of the calculator,
- an agent monitoring a specific protocol for data exchanges between two applications of the same calculator or between the calculator and another remote calculator.

6. The system according to claim 1, wherein the agent is an agent integrated into an application responsible for downloads and the configuration of the calculator and belongs to the collector.

7. The system according to claim 1, wherein for each detected incident, the aggregation and transmission logic applied by the agent defines at least one threshold of the number of detection occurrences of this incident or at least one detection frequency threshold of this incident for the triggering of the transmission of the detection messages of this incident to the collector.

8. The system according to claim 1, wherein, for each detected incident, the recording logic applied by the collector defines at least one threshold of the number of occurrences of detection messages of this incident or at least one reception frequency threshold of the detection messages of this incident.

9. The system according to claim 1, wherein the collector has context data relative to the aircraft or the flight of the aircraft and is configured to enrich the log(s) with the context data.

10. The system according to claim 1, wherein the collector is configured to record the log(s) in a predefined normalized format.

11. The system according to claim 1, wherein at least one detected incident corresponds to a computer attack of the aircraft.

12. The system according to claim 1, further comprising an alert unit intended to emit one or several alerts in real time based on the log(s), the alerts being intended for a crew of the aircraft.

13. The system according to claim 1, comprising transmission means configured to transfer the log(s) to a security center on the ground.

14. The system according to claim 1, wherein, for each detected incident, the configurable aggregation and transmission logic is configured to trigger or not trigger the transmission of the detection messages of this detected incident in function of defined parameters of the configurable transmission logic.

15. An embedded system on board an aircraft for detection and response to incidents with log recording, the aircraft comprising at least one calculator comprising a plurality of applications using and generating data, each application being configured to detect events based on data used and generated by this application and predefined information specifying these events,
the system comprising, for the or each calculator, a plurality of agents and a collector, each agent of the plurality of agents and the collector being embedded on board of the aircraft,
each agent being an application component dedicated to an identified application of the calculator, each agent being associated to a first volatile memory,
each agent being configured to apply an incident detection logic to the events detected by the identified application in order to detect, among these events, at least one incident and to generate detection messages of this detected incident,
each agent being configured to aggregate the detection messages of this detected incident in the first volatile memory associated to this agent in function of parameters of a configurable aggregation and transmission logic and each agent being configured to send the detection messages of this detected incident aggregated in the first memory associated to this agent to the collector in function of the parameters of the configurable aggregation and transmission logic,
the collector being configured to receive the detection messages of each detected incident sent by all the agents of the plurality of agents,
the collector being associated to a second volatile memory,
the collector being configured to aggregate the detection messages of each detected incident received from all the agents of the plurality of agents in the second volatile memory and to associate the detection messages aggregated in the second volatile memory with context data relative to the aircraft or the flight of the aircraft,
the collector being also configured to record said aggregated detection messages associated with said context data in one or several log(s) in function of defined parameters of a configurable recording logic, the configurable recording logic being configured to trigger or not trigger the recording of the detection messages of each detected incident associated with said context data in function of the defined parameters of the configurable recording logic,
each log of the one or several log(s) being representative of at least an avionic security incident, and
the embedded system further comprises an alert unit intended to emit one or several avionic alerts in real time based on the log(s).

* * * * *